(12) United States Patent
Wang

(10) Patent No.: US 11,398,782 B2
(45) Date of Patent: Jul. 26, 2022

(54) POWER CONVERTERS INCLUDING BIAS VOLTAGE SUPPLY CIRCUIT AND METHOD OF SUPPLYING BIAS SUPPLY VOLTAGE

(71) Applicant: Chengdu Monolithic Power Systems Co., Ltd., Chengdu (CN)

(72) Inventor: Siran Wang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 125 days.

(21) Appl. No.: 16/953,729

(22) Filed: Nov. 20, 2020

(65) Prior Publication Data

US 2021/0184584 A1  Jun. 17, 2021

(30) Foreign Application Priority Data

Dec. 16, 2019 (CN) .......................... 201911293637.3

(51) Int. Cl.
*H02M 3/335* (2006.01)
*H02M 1/08* (2006.01)

(52) U.S. Cl.
CPC ......... *H02M 3/33569* (2013.01); *H02M 1/08* (2013.01)

(58) Field of Classification Search
CPC .. H02M 3/33569; H02M 1/08; H02M 1/0006; H02M 3/285; H02M 7/219; H02M 3/33523

See application file for complete search history.

(56) References Cited

U.S. PATENT DOCUMENTS

| | | | |
|---|---|---|---|
| 7,274,575 B2 * | 9/2007 | Ramabhadran ... | H02M 3/33507 363/97 |
| 8,593,841 B2 | 11/2013 | Wang et al. | |
| 8,749,997 B2 | 6/2014 | Wang et al. | |
| 9,065,348 B2 | 6/2015 | Wang et al. | |
| 9,093,909 B2 | 7/2015 | Wang et al. | |
| 9,397,577 B2 | 7/2016 | Wang et al. | |
| 9,407,155 B2 | 8/2016 | Wang et al. | |
| 9,577,514 B2 | 2/2017 | Wang et al. | |
| 9,595,885 B2 | 3/2017 | Wang et al. | |
| 9,787,196 B2 | 10/2017 | Wang | |
| 10,348,182 B2 | 7/2019 | Wang | |
| 10,432,104 B2 | 10/2019 | Li et al. | |
| 10,673,344 B2 | 6/2020 | Wang | |
| 10,826,401 B2 | 11/2020 | Wang | |

(Continued)

*Primary Examiner* — Kyle J Moody
(74) *Attorney, Agent, or Firm* — Perkins Coie LLP

(57) ABSTRACT

A power converter includes a first and a second transformers having different auxiliary winding voltage levels. A bias voltage supply circuit generates a bias supply voltage of an integrated circuit used to control the power converter, and includes a first and a second bias supply branches jointly coupled to a supply capacitor to provide the bias supply voltage. When the bias supply voltage is higher than a threshold voltage, the first bias supply branch to receive the one with lower level of the two auxiliary winding voltages is switched from a deactivation state to an activation state to provide the bias supply voltage, when the bias supply voltage is less than the threshold voltage, the second bias supply branch to receive the one with larger level of the two auxiliary winding voltages is switched from the deactivation state to the activation state to provide the bias supply voltage.

20 Claims, 6 Drawing Sheets

(56) References Cited

U.S. PATENT DOCUMENTS

| | | | |
|---|---|---|---|
| 2013/0182464 A1* | 7/2013 | Woias | H02M 3/33507 |
| | | | 363/21.17 |
| 2020/0153352 A1 | 5/2020 | Wang | |
| 2020/0161985 A1 | 5/2020 | Li et al. | |
| 2020/0295666 A1* | 9/2020 | Chung | H02M 3/33523 |
| 2022/0103078 A1* | 3/2022 | Fan | H02M 1/0043 |
| 2022/0166325 A1* | 5/2022 | Wang | H02M 3/33523 |

* cited by examiner

POWER CONVERTERS INCLUDING BIAS VOLTAGE SUPPLY CIRCUIT AND METHOD OF SUPPLYING BIAS SUPPLY VOLTAGE

CROSS-REFERENCE TO RELATED APPLICATIONS

This application claims the benefit of CN application 201911293637.3, filed on Dec. 16, 2019, and incorporated herein by reference.

TECHNICAL FIELD

The present invention relates generally to electrical circuits, and more particularly, relates to power converters including a bias voltage supply circuit, and methods of supplying a bias supply voltage.

BACKGROUND

With the emergence of more and more charger products, such as E-bike, power tools, UPS require fast charge, a high power charger becomes a heat topic of current research. However, neither LLC resonant converter nor flyback converter can meet the emerging charger application due to its own major problems. In detail, on the one hand, when the power goes to hundreds of watts, it is impossible for conventional flyback converter to achieve high efficiency due to the high stress. On the other hand, the wide output voltage range of the charger application makes it very hard to design a high efficiency and low output ripple LLC resonant converter.

Subsequently, an interleaved flyback converter is selected to be a good solution to achieve both high efficiency and low output ripple. In order to achieve the most compact BOM and optimized efficiency for the high power charger application, there is one more thing that need to be addressed, which is the IC bias supply voltage. Bias voltage supply circuits are used to provide operating voltages needed by internal power control circuits or other IC circuits. Therefore, it is desirable to design an interleaved flyback converter including a dedicated bias voltage supply circuit, which can satisfy the requirements of the wide output range and high power operation.

SUMMARY

Embodiments of the present invention are directed to power converters, a power converter comprise an input circuit configured to receive an input voltage, an output circuit configured to provide an output voltage, a first and a second transformers coupled in parallel between the input circuit and the output circuit, and a bias voltage supply circuit configured to generate a bias supply voltage of an integrated circuit (IC) used in the input circuit. Each of the first and the second transformers has an auxiliary winding and a secondary winding and a turns ratio of the auxiliary winding to the secondary winding, wherein the turns ratio of the first transformer is higher than that of the second transformer. The bias voltage supply circuit comprises a supply capacitor, a first bias supply branch having a first terminal coupled to a first auxiliary winding of the first transformer and a second terminal coupled to the supply capacitor, and a second bias supply branch having a first terminal coupled to a second auxiliary winding of the second transformer and a second terminal coupled to the supply capacitor. Wherein the first bias supply branch is switched from a deactivation state to an activation state for providing the bias supply voltage when the bias supply voltage is higher than a threshold voltage, and the second bias supply branch is switched from the deactivation state to the activation state for providing the bias supply voltage when the bias supply voltage is less than the threshold voltage.

In addition, embodiments of the present invention are directed to power converters which comprise an input port configured to receive an input voltage, an output port configured to provide an output voltage, a first and a second isolated converters coupled in parallel between the input port and the output port, and a bias voltage supply circuit configured to generate a bias supply voltage of an integrated circuit used to control interleave operation of the first and the second isolated converters. The first isolated converter comprises a first transformer having a first auxiliary winding, the second isolated converter comprises a second transformer having a second auxiliary winding. The bias voltage supply circuit comprises a supply capacitor, a first bias supply branch having a first terminal coupled to the first auxiliary winding to receive a first auxiliary voltage and a second terminal coupled to the supply capacitor, and a second bias supply branch having a first terminal coupled to the second auxiliary winding to receive a second auxiliary voltage and a second terminal coupled to the supply capacitor, wherein the first auxiliary voltage is less than the second auxiliary voltage. Wherein the first bias supply branch is selected to provide the bias supply voltage when the bias supply voltage is higher than a threshold voltage, and the second bias supply branch is selected to provide the bias voltage when the bias supply voltage is less than the threshold voltage.

Furthermore, embodiments of the present invention are directed to methods of supplying a bias supply voltage of an integrated circuit used to control an interleaved flyback converter, wherein the interleaved flyback converter has a first and a second transformers having different auxiliary voltage levels, the method comprises rectifying a first auxiliary voltage developed on a first auxiliary winding of the first transformer and generating a first rectified voltage, rectifying a second auxiliary voltage developed on a second auxiliary winding of the second transformer and generating a second rectified voltage, wherein the first rectified voltage is less than the second rectified voltage, detecting the bias supply voltage on a supply capacitor, charging the supply capacitor with the first rectified voltage when the bias supply voltage is higher than a threshold voltage, and charging the supply capacitor with the second rectified voltage when the bias supply voltage is less than the threshold voltage.

BRIEF DESCRIPTION OF THE DRAWING

Non-limiting and non-exhaustive embodiments are described with reference to the following drawings. The drawings are only for illustration purpose. These drawings are not necessarily drawn to scale. The relative sizes of elements illustrated by the drawings may differ from the relative size depicted.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
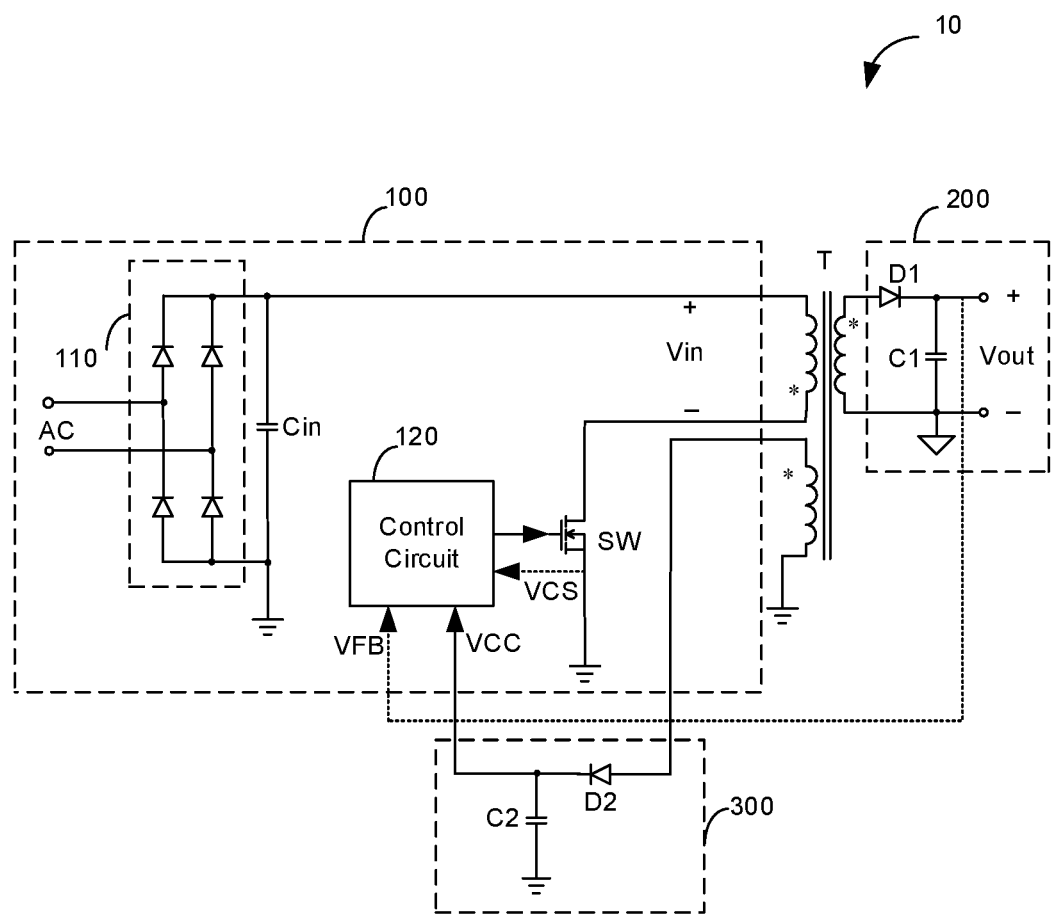
FIG. 1 illustrates a schematic diagram of a flyback converter 10.

A flyback converter in the art as an example is considered. FIG. 1 illustrates a schematic diagram of a flyback converter 10, which can include an input circuit 100, a transformer T, an output circuit 200, and a bias voltage supply circuit 300.

As shown in FIG. 1, the input circuit 100 may include a bridge diode 110 for rectifying an AC input, a capacitor Cin for smoothing the rectified voltage, a main switch SW, and a switching controller 120 for controlling a turn-on/turn-off operation of the main switch SW. The switching controller 120 may receive a current sensing voltage VCS that corresponds to the current flowing through the main switch SW and a feedback voltage VFB that corresponds to an output voltage Vout of the output circuit 200. The switching controller 120 can be generally realized by a single IC or as an assembly of its components, e.g. on a motherboard. Methods for generating the current sensing voltage VCS and the feedback voltage VFB will not be described since they are well known to a person of ordinary skill in the art. Further, a bias supply voltage VCC, used for operating the switching controller 120, can be provided through the bias voltage supply circuit 300.

The output circuit 300 may include a diode D1 and a capacitor C1. The diode D1 has an anode connected to a secondary winding of the transformer T. The capacitor C1 is connected between a cathode of the diode D1 and a secondary ground. In this architecture, the voltage at the capacitor C1 is essentially an output voltage Vout of the flyback converter 10.

The transformer T can be coupled between the input circuit 100 and the output circuit 200 to transmit the energy provided by the input circuit 100 to the output circuit 200. The transformer T may include a primary winding, the secondary winding and an auxiliary winding, wherein the primary winding has a first terminal for receiving an input voltage Vin and a second terminal connected to a primary ground through the main switch SW, the secondary winding has a first terminal connected to the diode D1 and a second terminal connected to the secondary ground, the auxiliary winding has a first terminal connected to the bias voltage supply circuit 300 and a second terminal connected to the primary ground.

The bias voltage supply circuit 300 may include a diode D2 and a capacitor C2. The diode D2 has an anode connected to the first terminal of the auxiliary primary winding. The capacitor C2 is connected between the cathode of the diode D2 and the primary ground. The bias voltage supply circuit 300 may supply a bias supply voltage VCC for operating the IC of the switching controller 120 in some embodiments.

However, if the conventional bias voltage supply circuit 300 is used in an interleaved flyback converter with wide output range, because of the requirement of the wide output range, the voltage developed in the auxiliary winding will vary a lot. As a result, with the conventional bias voltage supply circuit 300, the power loss is fairly high when the output voltage Vout goes high. For this reason, the auxiliary winding has to be designed based on a minimal output voltage of the interleaved flyback converter, which reduce the overall efficiency.

Another way of generating a proper bias supply voltage for the interleaved flyback converter is to use an extra standby power supply. This approach is, of course, usually too costly.

According to the invention, a power converter includes a first and a second transformers having different auxiliary winding voltage levels. A bias voltage supply circuit generates a bias supply voltage of an integrated circuit used to control the power converter. The bias voltage supply circuit comprises a first and a second bias supply branches jointly coupled to a supply capacitor to provide the bias supply voltage. When the bias supply voltage is higher than a threshold voltage, the first bias supply branch to receive the one with lower level of the two auxiliary winding voltages is switched from a deactivation state to an activation state to provide the bias supply voltage, when the bias supply voltage is less than the threshold voltage, the second bias supply branch to receive the one with larger level of the two auxiliary winding voltages is switched from the deactivation state to the activation state to provide the bias supply voltage.

Figure 2:
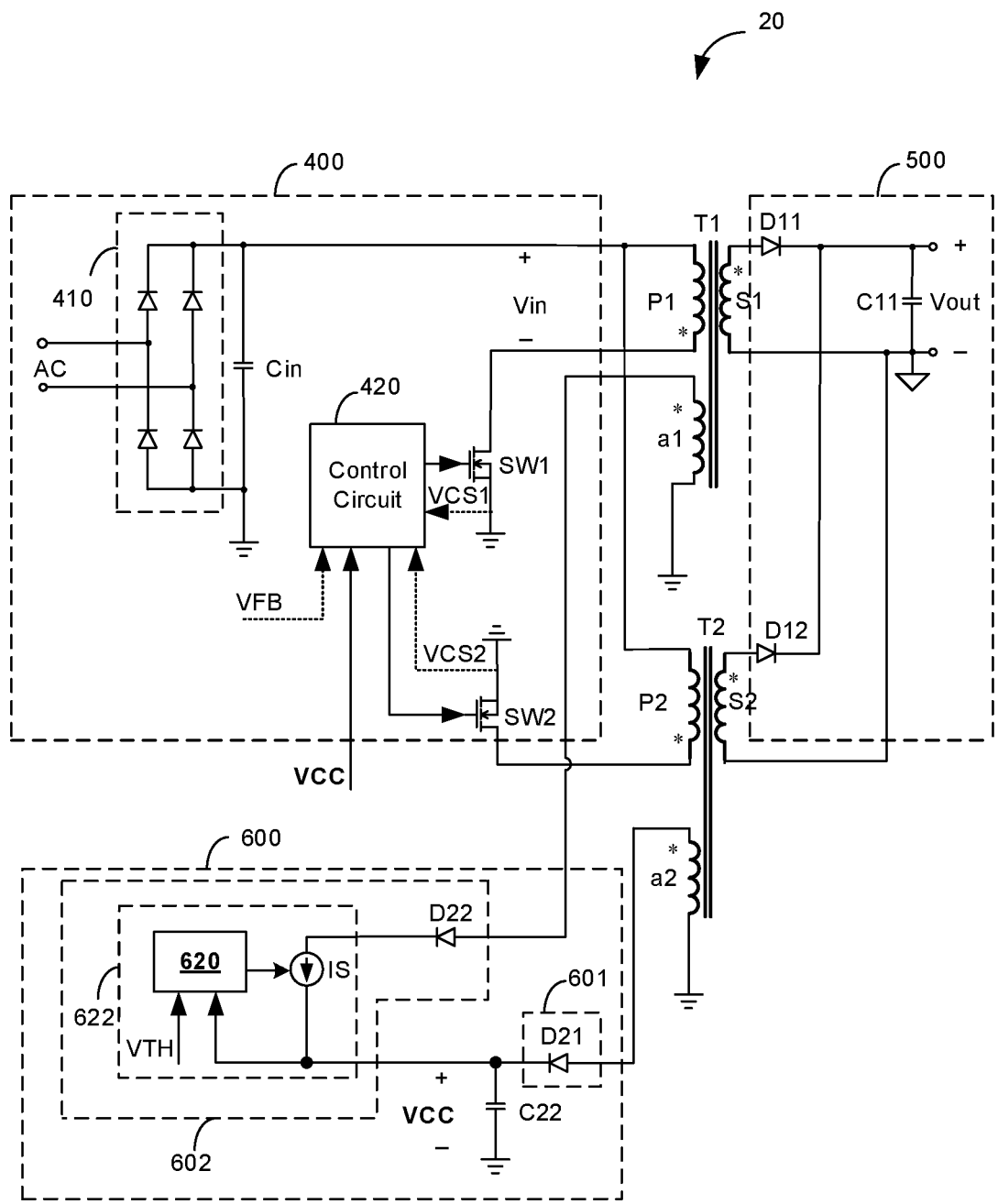
FIG. 2. illustrates a schematic diagram of an interleaved flyback converter 20 in accordance with an embodiment of the present invention.

FIG. 2. illustrates a schematic diagram of an interleaved flyback converter 20 in accordance with an embodiment of the present invention. As shown in FIG. 2, the interleaved flyback converter 20 comprises an input circuit 400, a first and a second transformers T1 and T2, an output circuit 500 and a bias voltage supply circuit 600.

The input circuit 400 comprises a bridge diode 410 for rectifying an AC input, a capacitor Cin for smoothing the rectified input voltage VIN, a first main switch SW1 and a second main switch SW2, and a switching controller 420 for controlling interleaved operation of the main switches SW1 and SW2. The output circuit 500 comprises diodes D11 and D12 and an output capacitor C11 for providing an output voltage Vout.

The first and second transformers T1 and T2 are coupled in parallel between the input circuit 400 and the output circuit 500, and are configured to transmit the energy provided in the input circuit 400 to the output circuit 500. The first transformer T1 has a primary winding P1, a secondary winding S1 and an auxiliary winding a1. The second transformer T2 has a primary winding P2, a secondary winding S2 and an auxiliary winding a2.

In the embodiment of FIG. 2, the interleaved flyback converter 20 comprises a first and a second flyback converters coupled in parallel, and the switching controller 420.

The first flyback converter comprises the first transformer T1, the main switch SW1, the diode D11 and the output capacitor C11. The primary winding P1 of the first transformer T1 receives the input voltage Vin across the input capacitor Cin, and is coupled to a primary ground through the main switch SW1. The secondary winding S1 of the first transformer T1 is coupled to an anode of the diode D11 and a secondary ground. The output capacitor C11 is coupled between the cathode of the diode D11 and the secondary ground.

The second flyback converter comprises the second transformer T2, the main switch SW2, the diode D12 and an output capacitor C11. The primary winding P2 of the second transformer T2 receives the input voltage Vin across the input capacitor Cin, and is coupled to the primary ground through the main switch SW2. The secondary winding S2 of the second transformer T2 is coupled to an anode of the diode D12 and the secondary ground. The output capacitor C11 is coupled between the cathode of the diode D12 and the secondary ground.

The first and the second flyback converters share the input capacitor Cin and the output capacitor C11, uses the interleaved technique to reduce the number of the devices and cost, and to improve the total efficiency.

The switching controller 420 is configured to control the interleaved operation of the two paralleled-connection flyback converters. In the embodiment of FIG. 2, the switching controller 420 receives a feedback voltage VFB that corresponds to an output voltage Vout of the output circuit 500, a first and a second current sensing signals VCS1 and VCS2 that correspond to the currents flowing through the main switches SW1 and SW2, respectively. Methods or circuits for generating the current sensing signals VCS1, VCS2 and the feedback voltage VFB will not be described in detail since they are well known to a person of ordinary skill in the art.

The bias voltage supply circuit 600 comprises a first supply branch 601 and a second supply branch 602, and is configured to provide a bias supply voltage VCC for the switching controller 420 used in the input circuit 400.

The first bias supply branch 601 has a first terminal coupled to the auxiliary winding a2 of the second transformer T2 and a second terminal coupled to a supply capacitor C22. In the embodiment of FIG. 2, the first bias branch 601 comprises a diode D21. The supply capacitor C22 has a first terminal and a second terminal coupled to the primary ground. The anode of the diode D21 is coupled to a first terminal of the auxiliary winding a2, the cathode of the diode D21 is couple to the first terminal of the supply capacitor C22. A second terminal of the auxiliary winding a1 is coupled to the primary ground.

Compared with the prior bias voltage supply circuit 300 shown in FIG. 1, a difference of the proposed bias voltage supply circuit 600 is that the bias voltage supply circuit 600 further comprises a second bias supply branch 602. The second bias supply branch 602 has a first terminal coupled to the auxiliary winding a1 of the first transformer T1 and a second terminal coupled to the supply capacitor C22. According to the invention, the first bias supply branch 601 is switched from a deactivation state to an activation state for providing the bias supply voltage VCC when the bias supply voltage VCC is higher than a threshold voltage VTH, and the second bias supply branch 602 is switched from the deactivation state to the activation state for providing the bias supply voltage VCC when the bias supply voltage VCC is less than the threshold voltage VTH.

In the embodiment of FIG. 2, the second bias supply branch 602 comprises a diode D22 and a controllable switching circuit 622. The diode D22 has an anode connected to a first terminal of the auxiliary winding a1 and a cathode. The controllable switching circuit 622 has a first terminal coupled to the cathode of the diode D22 and a second terminal coupled to the supply capacitor C22. The controllable switching circuit 622 is configured to allow a current from the auxiliary winding a1 to charge the supply capacitor C22 during the activation state and block the current during the deactivation state.

As shown in FIG. 2, the controllable switching circuit 622 comprises a comparison circuit 620 and a current source IS. The comparison circuit 620 has a first input terminal coupled to the supply capacitor C22 for receiving the bias supply voltage VCC, a second input terminal coupled to receive the threshold voltage VTH, and an output terminal. The current source IS has an input terminal coupled to the cathode of the diode D22, and an output terminal coupled to the supply capacitor C22 and a control terminal coupled to the output terminal of the comparison circuit 620. The comparison circuit 620 compares the bias supply voltage VCC with the threshold voltage VTH, controls the turning-ON and turning-OFF of the current source IS based on the comparison results. In one embodiment, when the bias supply voltage VCC is less than the threshold voltage VTH, the current source IS is turned ON, the energy stored in the auxiliary winding a1 is transferred to the capacitor C22 for providing the bias supply voltage VCC.

Since the interleaved technique is utilized, the parameters of the first and the second flyback converters are expected to be essentially the same, the number Np1 of turns of the primary winding P1 is equal to the number Np2 of turns of the primary winding P2, and the number Ns1 of turns of the secondary winding N1 is equal to the number Ns2 of turns of the secondary winding S2, i.e., Np1=Np2, Ns1=Ns2. Specially, the number Na1 of turns of the auxiliary winding a1 is designed to higher than the number Na2 of turns of the primary winding a2. In one embodiment, a turns ratio of the auxiliary winding a1 to the secondary winding S1 is higher than that of the auxiliary winding a2 to the secondary winding S2.

During the interleaved operation of the first and the second flyback converters, the auxiliary voltage Va1 developed on the auxiliary winding a1 can be expressed as: Va1=Vout*Na1/Ns1. The auxiliary voltage Va2 developed on the auxiliary winding a2 can be expressed as: Va2=Vout*Na2/Ns2. A following table can be given as examples bases on the above equations.

| Np1 = Np2 | Ns1 = Ns2 | Na1 | Na2 | Vout | Va1 | Va2 |
|---|---|---|---|---|---|---|
| 10 | 2 | 1 | 0.2 | 50 V | 25 V | 5 V |
| 10 | 2 | 1 | 0.2 | 10 V | 5 V | 1 V |

A turns ratio of the primary winding to the secondary winding is 5:1, when the output voltage Vout is 50V, the auxiliary voltage Va2 developed on the auxiliary winding a2 is 5V, the bias supply voltage VCC is provided through the diode D21. When the output voltage Vout is decreased, for example, is decreased to be 10V, the auxiliary voltage Va2 developed on the auxiliary winding a2 is 1V that cannot provide the required bias supply voltage VCC for the switching controller 420. When the condition of the bias supply voltage VCC less than the threshold voltage VTH is detected, the current source IS is turned ON, the auxiliary voltage Va1 developed on the auxiliary winding a1 is 5V and is enough to provide the bias supply voltage VCC through the current source IS. It can be seen, when the output voltage Vout varies within a wide range, the proposed bias voltage supply circuit 600 can automatically provide appropriate bias supply voltage VCC for the operation of the interleaved flyback converter 20.

Figure 3:
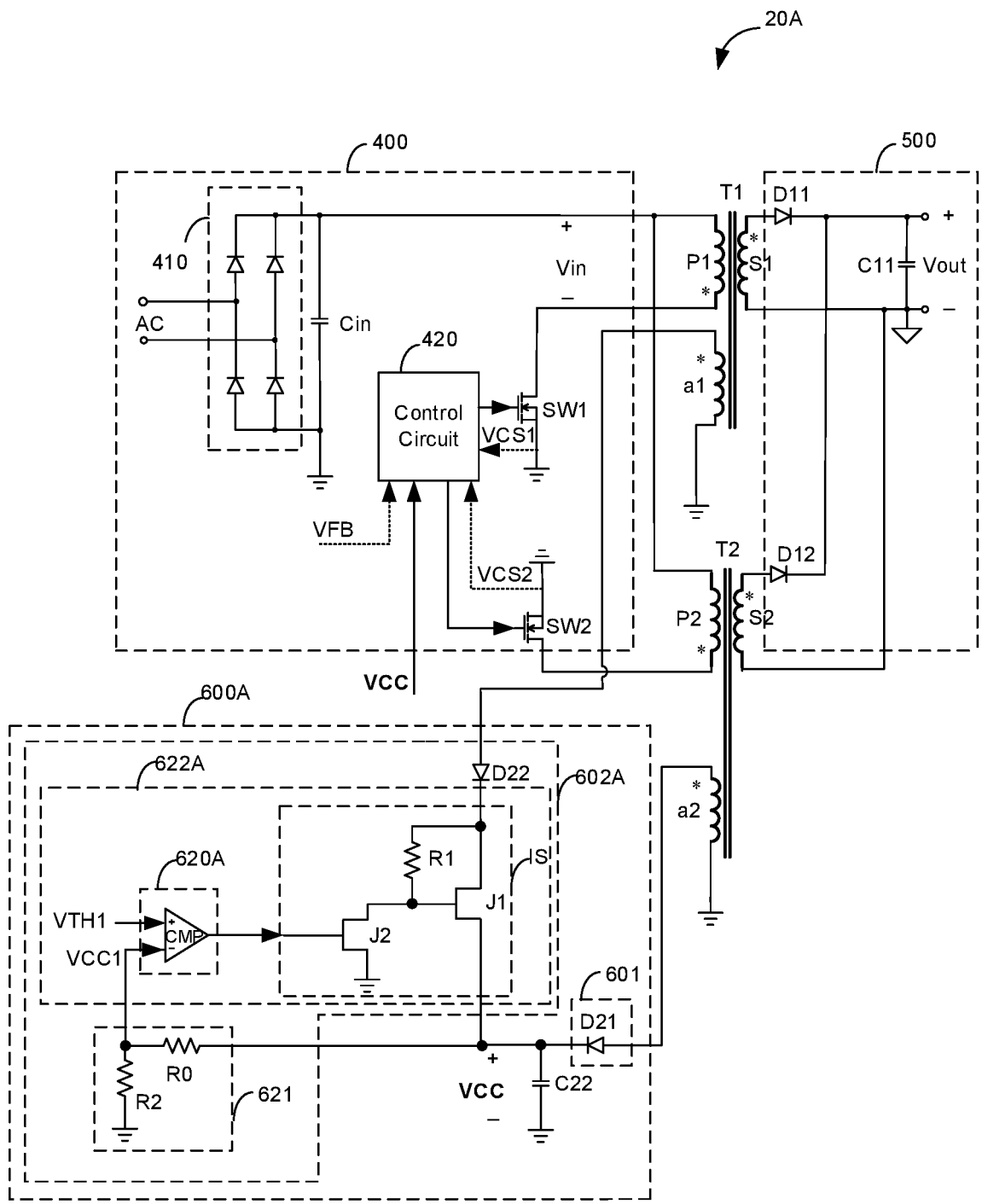
FIG. 3. illustrates a schematic diagram of an interleaved flyback converter 20A in accordance with another embodiment of the present invention.

FIG. 3. illustrates a schematic diagram of an interleaved flyback converter 20A in accordance with another embodiment of the present invention. A difference between the interleaved flyback converter 20A shown in FIG. 3 and the interleaved flyback converter 20 shown in FIG. 2 is that the second bias branch 621 further comprises a voltage detection circuit 601. The voltage detection circuit 601 is configured to detect the bias supply voltage VCC and to provide a voltage detection signal VCC1 proportional to the bias supply voltage VCC. In the embodiment of FIG. 3, a bias voltage supply circuit 600A comprises the first bias supply branch 601 and a second bias supply branch 602A comprising the diode D22, the voltage detection circuit 621 and a controllable switching circuit 622A. The voltage detection circuit 621 comprises a first and second divider resistors R0 and R2, and the junction of the first and second divider resistors R0 and R2 provides the voltage detection signal VCC1. The controllable switching circuit 622A comprises a comparison circuit 620A and the current source IS.

The comparison circuit 620A has a non-inverting input terminal configure to receive a value VTH1 proportional to the threshold voltage VTH, an inverting input terminal configured to receive the voltage detection signal VCC1, and an output terminal. The current source IS may comprise junction field effect transistors (JFETs) J1, J2 and a resistor R1. The transistor J1 has a first terminal, a second terminal and a control terminal. The first terminal of the transistor J1 is configured as the input terminal of the current source IS, and is coupled to the cathode of the diode D22 to receive the rectified voltage from the auxiliary winding a1. The second terminal of the transistor J1 is configured as the output terminal of the current source IS and coupled to the supply capacitor C22. The resistor R1 has a first terminal and a second terminal, wherein the first terminal is coupled to the first terminal of the transistor J1, the second terminal is coupled to the control terminal of the transistor J1. The transistor J2 has a first terminal, a second terminal and a control terminal, wherein the first terminal is coupled to the second terminal of the resistor R1 and the control terminal of the transistor J1, the second terminal is coupled to the ground. The control terminal of the transistor J2 is configured as the control terminal of the current source IS and coupled to the output terminal of the comparison circuit 620A. In other embodiments, the current source IS may be configured in other suitable structures.

Figure 4:
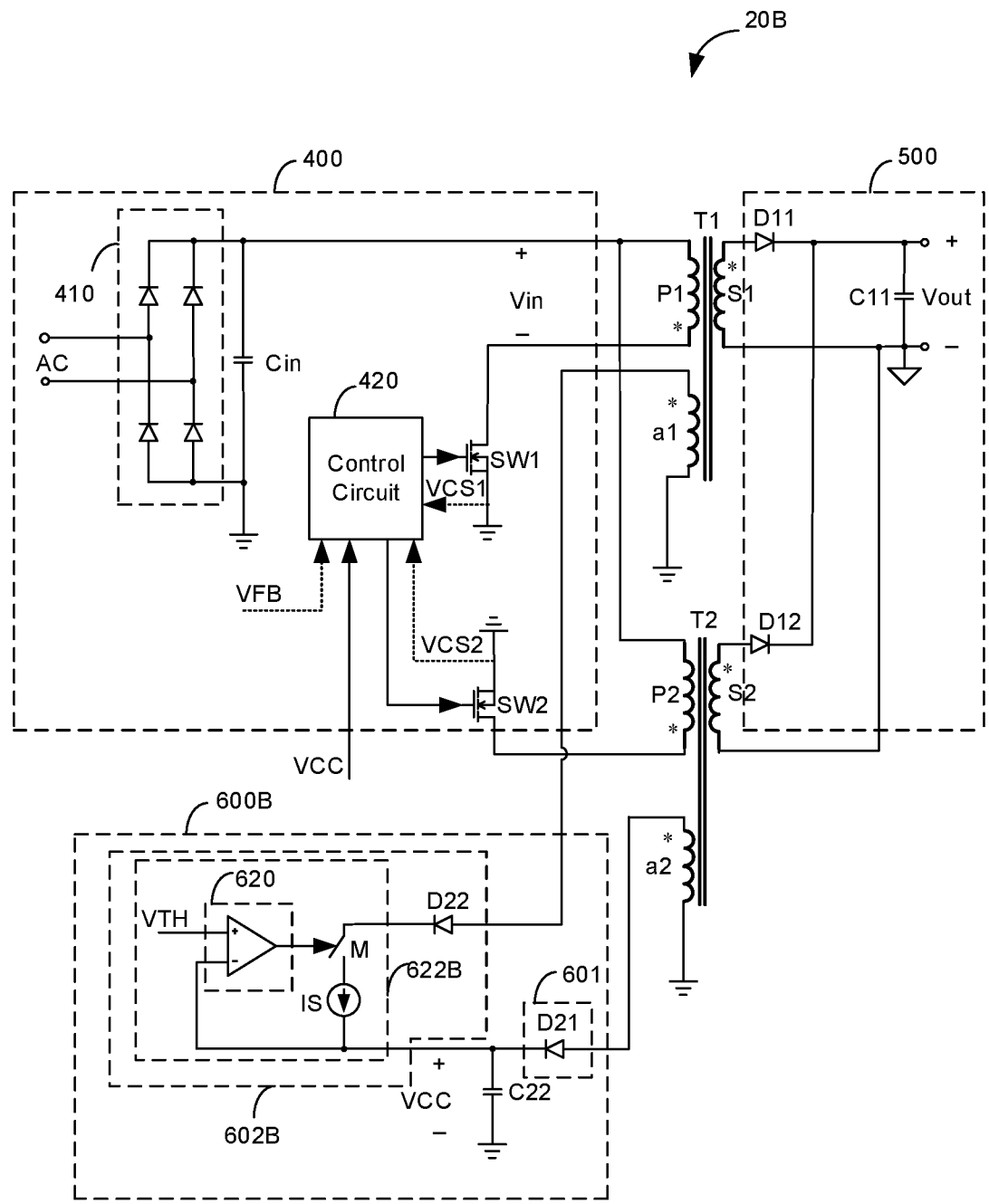
FIG. 4. illustrates a schematic diagram of an interleaved flyback converter 20B in accordance with yet another embodiment of the present invention.

FIG. 4. illustrates a schematic diagram of an interleaved flyback converter 20B in accordance with yet another embodiment of the present invention. A difference between the interleaved flyback converter 20B shown in FIG. 4 and the interleaved flyback converter 20 shown in FIG. 2 is that the controllable switching circuit 622B further comprises a branch switch M. The branch switch M has a first terminal coupled to the cathode of the diode D22, a second terminal coupled to the input terminal of the current source IS, and a control terminal coupled to the output terminal of the comparison circuit 620. Based on the comparison of the bias supply voltage VCC and the threshold voltage VTH, when the bias supply voltage VCC is less than the threshold voltage VTH, the branch switch M is turned ON and the supply capacitor C22 is charged by the current source IS.

Figure 5:
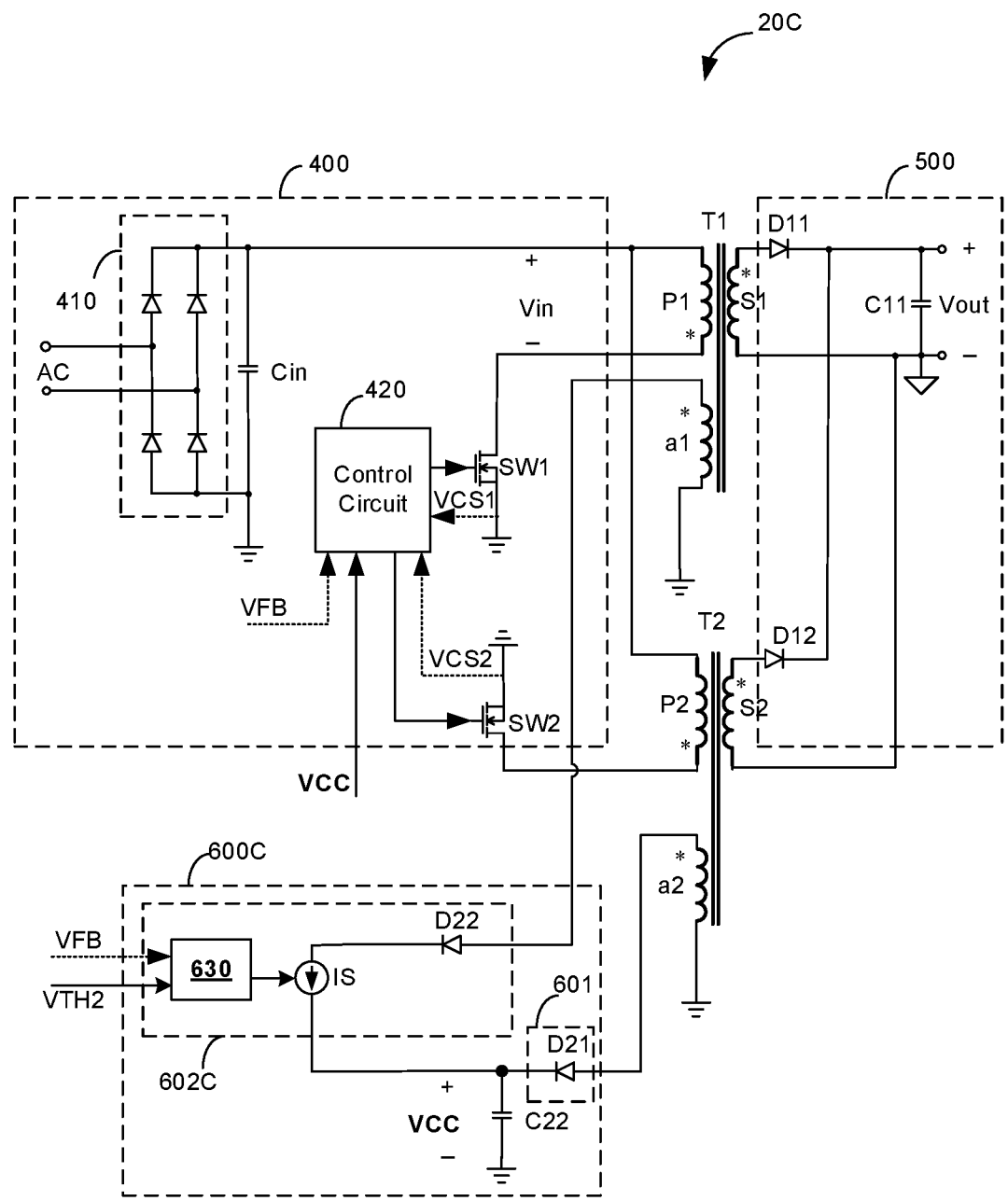
FIG. 5. illustrates a schematic diagram of an interleaved flyback converter 20C in accordance with still another embodiment of the present invention.

FIG. 5. illustrates a schematic diagram of an interleaved flyback converter 20C in accordance with still another embodiment of the present invention. In the embodiment of FIG. 5, the second bias supply branch 602C is configured to provide the bias supply voltage VCC when the output voltage Vout is less than a preset value VTH2. The bias supply voltage VCC can indicate the output voltage Vout when the turns ratio of the auxiliary winding to the secondary winding is determined.

In the embodiment of FIG. 5, when the output voltage Vout has a higher value, for example, 50V, an output voltage detection circuit 630 provides a flag signal with low level. The auxiliary winding a2 is used to provide the bias supply voltage VCC through the first bias supply branch 601. When the output voltage Vout has a low value, for example, 10V, the output voltage detection circuit 630 provides the flag signal with high level. The auxiliary voltage Va2 developed in the auxiliary winding a2 is too small to provide the bias supply voltage VCC for the switching controller 420. The auxiliary winding a1 is selected to provide the bias supply voltage VCC through the second bias supply branch 602C. In a further embodiment, the current source IS coupled between the diode D22 and the supply capacitor C22 is turned ON when the output voltage Vout is low.

Figure 6:
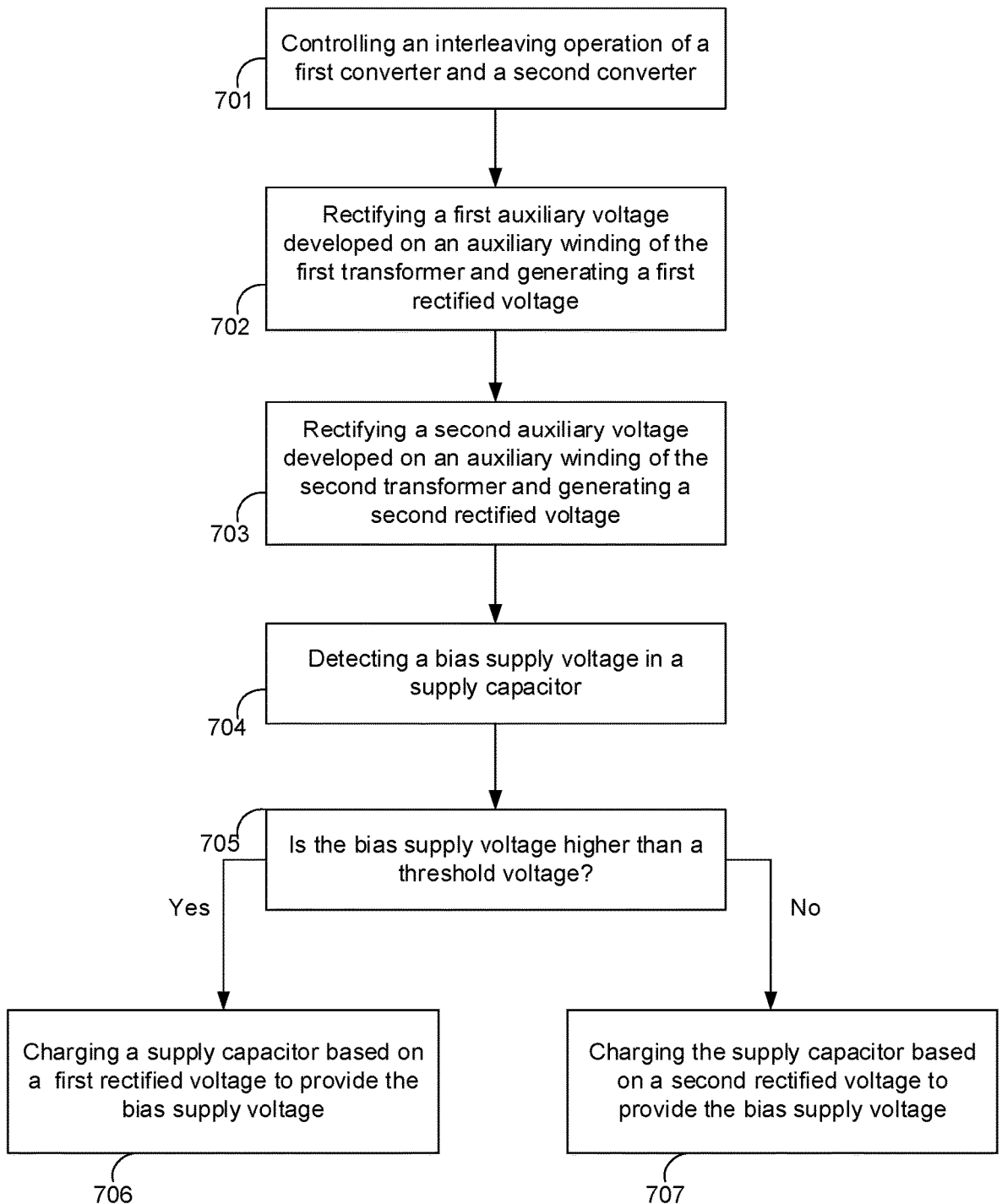
FIG. 6 illustrates a method of supplying a bias supply voltage in accordance with an embodiment of the present invention.

FIG. 6 illustrates a method of supplying a bias supply voltage of an integrated circuit used to control an interleaved flyback converter. The interleaved flyback converter has a first and a second transformers having different auxiliary voltage levels. At first, after the startup is complete, at step 701, the integrated circuit is configured to control the interleaved operation of the interleaved flyback converter, while a bias voltage supply circuit is configured to provide the bias supply voltage for the integrated circuit. The method for supplying the bias supply voltage comprises steps 702-706.

At step 702, a first auxiliary voltage developed on a first auxiliary winding of the first transformer is rectified and a first rectified voltage is generated.

At step 703, a second auxiliary voltage developed on a second auxiliary winding of the second transformer is rectified and a second rectified voltage is generated. The first rectified voltage is less than the second rectified voltage.

At step 704, the bias supply voltage on a supply capacitor is detected or monitored.

At step 705, the bias supply voltage and a threshold voltage is compared.

At step 706, the supply capacitor is charged with the first rectified voltage when the bias supply voltage is higher than a threshold voltage.

At step 707, the supply capacitor is charged with the second rectified voltage when the bias supply voltage is less than the threshold voltage.

In one embodiment, the supply capacitor is charged with the second rectified voltage when the bias supply voltage indicates that an output voltage of the interleaved flyback converter is less than a preset value.

Embodiments of the invention are described herein in the context of one practical non-limiting application, namely, an interleaved flyback converter. Embodiments of the invention, however, are not limited to such applications, and the techniques described herein may also be utilized in other power supply converter, such as interleaved LLC resonant converter.

The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A power converter, comprising:
an input circuit configured to receive an input voltage;
an output circuit configured to provide an output voltage;
a first transformer and a second transformer coupled in parallel between the input circuit and the output circuit, and each having an auxiliary winding and a secondary winding and a turns ratio of the auxiliary winding to the secondary winding, wherein the turns ratio of the first transformer is higher than that of the second transformer;
a bias voltage supply circuit configured to generate a bias supply voltage of an integrated circuit (IC) used in the input circuit, wherein the bias voltage supply circuit comprises:
a supply capacitor;
a first bias supply branch having a first terminal coupled to a first auxiliary winding of the first transformer and a second terminal coupled to the supply capacitor;
a second bias supply branch having a first terminal coupled to a second auxiliary winding of the second transformer and a second terminal coupled to the supply capacitor; and
wherein the first bias supply branch is switched from a deactivation state to an activation state for providing the bias supply voltage when the bias supply voltage is higher than a threshold voltage, and the second bias supply branch is switched from a deactivation state to an activation state for providing the bias supply voltage when the bias supply voltage is less than the threshold voltage.

2. The power converter of claim 1, wherein the first supply branch comprises a first diode having an anode coupled to the first auxiliary winding and a cathode coupled to the supply capacitor.

3. The power converter circuit of claim 1, wherein the second supply branch comprises:
a second diode having an anode connected to the second auxiliary winding and a cathode;
a voltage detection circuit configured to detect the bias supply voltage and to provide a voltage detection signal proportional to the bias supply voltage; and
a controllable switching circuit coupled to the voltage detection circuit, and having a first terminal coupled to the cathode of the second diode and a second terminal coupled to the supply capacitor, the controllable switching circuit is configured to allow a current from the second auxiliary winding to charge the supply capacitor during the activation state of the second bias supply branch and block the current during the deactivation state of the second bias supply branch.

4. The power converter of claim 3, wherein the voltage detection circuit comprises a first and second divider resistors, and a junction of the first and second divider resistors provides the voltage detection signal.

5. The power converter of claim 4, wherein the controllable switching circuit comprises:
a first comparison circuit having a first terminal coupled to receive the voltage detection signal, a second terminal coupled to receive a first voltage proportional to the threshold voltage, and an output terminal; and
a first current source having an input terminal coupled to the cathode of the second diode, an output terminal coupled to the supply capacitor and a control terminal coupled to the output terminal of the first comparison circuit.

6. The power converter of claim 5, wherein the first current source comprises:
a first junction field effect transistor (JFET) having a first terminal coupled to the cathode of the second diode, a second terminal coupled to the supply capacitor and a control terminal;
a resistor having a first terminal coupled to the first terminal of the first JFET, a second terminal coupled to the control terminal of the first JFET; and
a second JFET having a first terminal coupled to the second terminal of the resistor, a second terminal coupled to the ground, and a control terminal is coupled to the output terminal of the first comparison circuit.

7. The power converter of claim 3, wherein the controllable switching circuit comprises:
a second comparison circuit having a first terminal coupled to receive the voltage detection signal, a second terminal coupled to receive a second value proportional to the threshold voltage, and an output terminal;
a branch switch having a first terminal coupled to the cathode of the second diode, a second terminal, and a control terminal coupled to the output terminal of the second comparison circuit; and
a second current source having an input terminal coupled to the second terminal of the branch switch and an output terminal coupled to the supply capacitor.

8. The power converter of claim 1, wherein the power converter comprises an interleaved flyback converter.

9. The power converter of claim 1, wherein the power converter comprises an interleaved LLC resonant converter.

10. A power converter, comprising:
an input port configured to receive an input voltage;
an output port configured to provide an output voltage;
a first and a second isolated converters coupled in parallel between the input port and the output port, wherein the first isolated converter comprises a first transformer having a first auxiliary winding, the second isolated converter comprises a second transformer having a second auxiliary winding;
a bias voltage supply circuit configured to generate a bias supply voltage of an integrated circuit used to control interleave operation of the first and the second isolated converters, wherein the bias voltage supply circuit comprises:
a supply capacitor;
a first bias supply branch having a first terminal coupled to the first auxiliary winding to receive a first auxiliary voltage, and a second terminal coupled to the supply capacitor; and
a second bias supply branch having a first terminal coupled to the second auxiliary winding to receive a second auxiliary voltage, and a second terminal coupled to the supply capacitor, wherein the first auxiliary voltage is less than the second auxiliary voltage; and
wherein the first bias supply branch is selected to provide the bias supply voltage when the bias supply voltage is higher than a threshold voltage, and the second bias supply branch is selected to provide the bias voltage when the bias supply voltage is less than the threshold voltage.

11. The power converter of claim 10, wherein the first supply branch comprises a first diode, the first diode has an anode coupled to the first auxiliary winding and a cathode coupled to the supply capacitor.

12. The power converter circuit of claim 10, wherein the second supply branch comprises:
a second diode having an anode connected to the second auxiliary winding, and a cathode;
a voltage detection circuit configured to detect the bias supply voltage and to provide a voltage detection signal proportional to the bias supply voltage; and
a controllable switching circuit coupled to the voltage detection circuit, and having a first terminal coupled to the cathode of the second diode and a second terminal coupled to the supply capacitor, the controllable switching circuit is configured to allow a current from the second auxiliary winding to charge the supply capacitor during an activation state and block the current during a deactivation state.

13. The power converter of claim 12, wherein the voltage detection circuit comprises a first and second divider resistors, and a junction of the first and second divider resistors provides the voltage detection signal.

14. The power converter of claim 13, wherein the controllable switching circuit comprises:

a first comparison circuit having a first terminal coupled to receive the voltage detection signal, a second terminal coupled to receive a first value proportional to the threshold voltage, and an output terminal; and
a first current source having an input terminal coupled to the cathode of the second diode, an output terminal coupled to the supply capacitor and a control terminal coupled to the output terminal of the first comparison circuit.

15. The power converter of claim 13, wherein the controllable switching circuit comprises:
a second comparison circuit having a first terminal coupled to receive the voltage detection signal, a second terminal coupled to receive a second voltage proportional to the threshold voltage, and an output terminal;
a branch switch having a first terminal coupled to the cathode of the second diode, a second terminal, and a control terminal coupled to the output terminal of the second comparison circuit; and
a second current source having an input terminal coupled to the second terminal of the branch switch and an output terminal coupled to the supply capacitor.

16. The power converter of claim 10, wherein the power converter comprises an interleaved flyback converter.

17. A method of supplying a bias supply voltage of an integrated circuit used to control an interleaved flyback converter, wherein the interleaved flyback converter has a first and a second transformers having different auxiliary voltage levels, the method comprising:
rectifying a first auxiliary voltage developed on a first auxiliary winding of the first transformer and generating a first rectified voltage;
rectifying a second auxiliary voltage developed on a second auxiliary winding of the second transformer and generating a second rectified voltage, wherein the first rectified voltage is less than the second rectified voltage;
detecting the bias supply voltage on a supply capacitor;
charging the supply capacitor with the first rectified voltage when the bias supply voltage is higher than a threshold voltage; and
charging the supply capacitor with the second rectified voltage when the bias supply voltage is less than the threshold voltage.

18. The method of claim 17, wherein detecting the bias supply voltage comprises providing a voltage detection signal proportional to the bias supply voltage.

19. The method of claim 17, wherein charging the supply capacitor with the second rectified voltage comprises turning on a current source to allow a current from the second auxiliary winding to charge the supply capacitor.

20. The method of claim 17, wherein charging the supply capacitor with the second rectified voltage when the bias supply voltage indicates that an output voltage of the interleaved flyback converter is less than a preset value.

* * * * *